(12) United States Patent
Chang

(10) Patent No.: US 6,503,168 B2
(45) Date of Patent: Jan. 7, 2003

(54) PLANETARY GEAR DEVICE FOR REDUCING SPEED OF AN OUTPUT SHAFT OF A MOTOR

(75) Inventor: Robin C. S. Chang, Taichung (TW)

(73) Assignee: Apex Dynamics, Inc., Taichung (TW)

( * ) Notice: Subject to any disclaimer, the term of this patent is extended or adjusted under 35 U.S.C. 154(b) by 0 days.

(21) Appl. No.: 09/880,622

(22) Filed: Jun. 12, 2001

(65) Prior Publication Data
US 2002/0187875 A1 Dec. 12, 2002

(51) Int. Cl.7 .................................................. F16H 57/08
(52) U.S. Cl. ........................................ 475/348; 475/331
(58) Field of Search ................................ 475/331, 348, 475/335, 336, 340, 339, 343

(56) References Cited

U.S. PATENT DOCUMENTS

| | | | | |
|---|---|---|---|---|
| 1,820,061 A | * | 8/1931 | Flagg | 475/331 |
| 3,292,460 A | * | 12/1966 | Fritsch | 475/348 |
| 3,315,547 A | * | 4/1967 | Fritsch | 475/348 |
| 3,381,548 A | * | 5/1968 | Wolkenstein | 475/348 |
| 5,687,480 A | | 11/1997 | Khariton et al. | 29/893.2 |
| 6,129,648 A | * | 10/2000 | Tanioka et al. | 475/331 |

FOREIGN PATENT DOCUMENTS

JP  2118237  *  5/1990  ........ 475/348

* cited by examiner

Primary Examiner—Charles A. Marmor
Assistant Examiner—Ha Ho
(74) Attorney, Agent, or Firm—Christie, Parker & Hale, LLP

(57) ABSTRACT

A planetary gear device includes a bearing member mounted on an inner coupling annular wall surface of a planet carrier to support rotatably a force transmitting member relative to the planet carrier in an accommodating chamber of a mounting frame. A sun wheel member of the force transmitting member meshes with a plurality of planet wheel members which mesh in turn with an inner annular toothed portion of the mounting frame so as to reduce speed of an output shaft of a motor that is coupled with a tubular coupling portion of the force transmitting member. With such an arrangement, accurate alignment of the sun wheel member with the planet carrier can be maintained.

4 Claims, 4 Drawing Sheets

PLANETARY GEAR DEVICE FOR REDUCING SPEED OF AN OUTPUT SHAFT OF A MOTOR

BACKGROUND OF THE INVENTION

1. Field of the Invention

This invention relates to a planetary gear device, more particularly to a planetary gear device for reducing speed of an output shaft of a motor.

2. Description of the Related Art

Referring to FIG. 1, a conventional planetary gear device is shown to include a mounting frame 2, and an adapter frame 3 which is secured to the mounting frame 2. A planet carrier 4 includes an output shaft 404 which is rotatably mounted in the mounting frame 2 via a first bearing member 401 and which extends outwardly to transmit rotary movement of reduced speed to a load, and a carrying frame member 405 which is surrounded by an inner annular toothed portion 201 of the mounting frame 2 and which is rotatably mounted in the mounting frame 2 via a second bearing member 402. A plurality of planet wheel members 406 are rotatably mounted on the carrying frame member 405, and mesh with the inner annular tooth portion 201. A force transmitting member 5 includes a sun wheel member 501 which meshes with the planet wheel members 406, and a coupling tubular member 502 with an outer circumferential wall surface which confronts an inner peripheral wall surface of the adapter frame 3 to couple with and to be driven by an output shaft (not shown) of a motor. A third bearing member 6 includes outer and inner annular races 601,602, and is interposed between the inner peripheral wall surface and the coupling tubular member 502 to rotatably support the coupling tubular member 502 relative to the adapter frame 3. A pair of oil seal members 403,603 are disposed to confine a lubricating oil passage for the bearing members 401,402,6, the inner annular tooth portion 201, planet wheel members 406 and the sun wheel member 501. However, misalignment of the sun wheel member 501 with the planet carrier 4 easily results after assembly of the mounting and adapter frames 2,3, and will arise large noise and vibration between the sun wheel member 501 and the planet wheel members 406 during the force transmitting operation.

To solve the above problem, referring to FIG. 2, another conventional planetary gear device, such as that disclosed in U.S. Pat. No. 5,687,480, is shown to include a deformable O-ring 301' disposed between an inner peripheral wall surface of an adapter frame 3' and a bearing member 6'. As such, a tolerance connection is maintained between a sun wheel member 5' and a mounting frame 2' for accurate meshing between the sun wheel member 5' and planet wheel members 406'. However, the misalignment of the sun wheel member 5' with a planet carrier (not shown) can still occur due to fatigue and wearing of the O-ring 301' after a long-term use.

SUMMARY OF THE INVENTION

The object of the present invention is to provide a planetary gear device which can overcome the aforesaid drawbacks of the prior art.

According to this invention, the planetary gear device includes a mounting frame with an inner annular wall surface which surrounds a first axis and which extends in an axial direction parallel to the first axis to confine an accommodation chamber. The inner annular wall surface includes proximate and distal annular segments opposite to each other in the axial direction, and an intermediate annular segment which is interposed therebetween and which has an inner annular toothed portion. A planet carrier includes an output shaft which is rotatably mounted on the distal annular segment about the first axis via a first bearing member and which extends outwardly of the accommodation chamber so as to be adapted to transmit rotary movement of reduced speed to a load, and a carrying frame member with mounting and coupling frame portions. The mounting frame portion extends from the output shaft in the axial direction, and is surrounded by the inner annular toothed portion. The coupling frame portion extends from the mounting frame portion in the axial direction, and has inner and outer coupling annular wall surfaces opposite to each other in a radial direction relative to the axial direction. The outer coupling annular wall surface is rotatably mounted on the proximate annular segment via a second bearing member. A plurality of planet wheel members are angularly displaced from one another, and are rotatably mounted on the mounting frame portion about a plurality of second axes which are parallel to the first axis such that each of the planet wheel members meshes with the inner annular toothed portion. A force transmitting member includes a sun wheel member which extends along the first axis and which meshes with the planet wheel members, and a coupling tubular member with a circumferential mounting portion and a tubular coupling portion. The circumferential mounting portion extends from the sun wheel member in the axial direction, and has an outer circumferential wall surface which confronts and which is rotatably mounted on the inner coupling annular wall surface via a third bearing member. The tubular coupling portion extends from the circumferential mounting portion in the axial direction and outwardly of the coupling frame portion so as to be adapted to couple with and be driven by an output shaft of a motor.

BRIEF DESCRIPTION OF THE DRAWINGS

Other features and advantages of the present invention will become apparent in the following detailed description of the preferred embodiment of the invention with reference to the accompanying drawings, in which.

DETAILED DESCRIPTION OF THE PREFERRED EMBODIMENT

Figure 3:
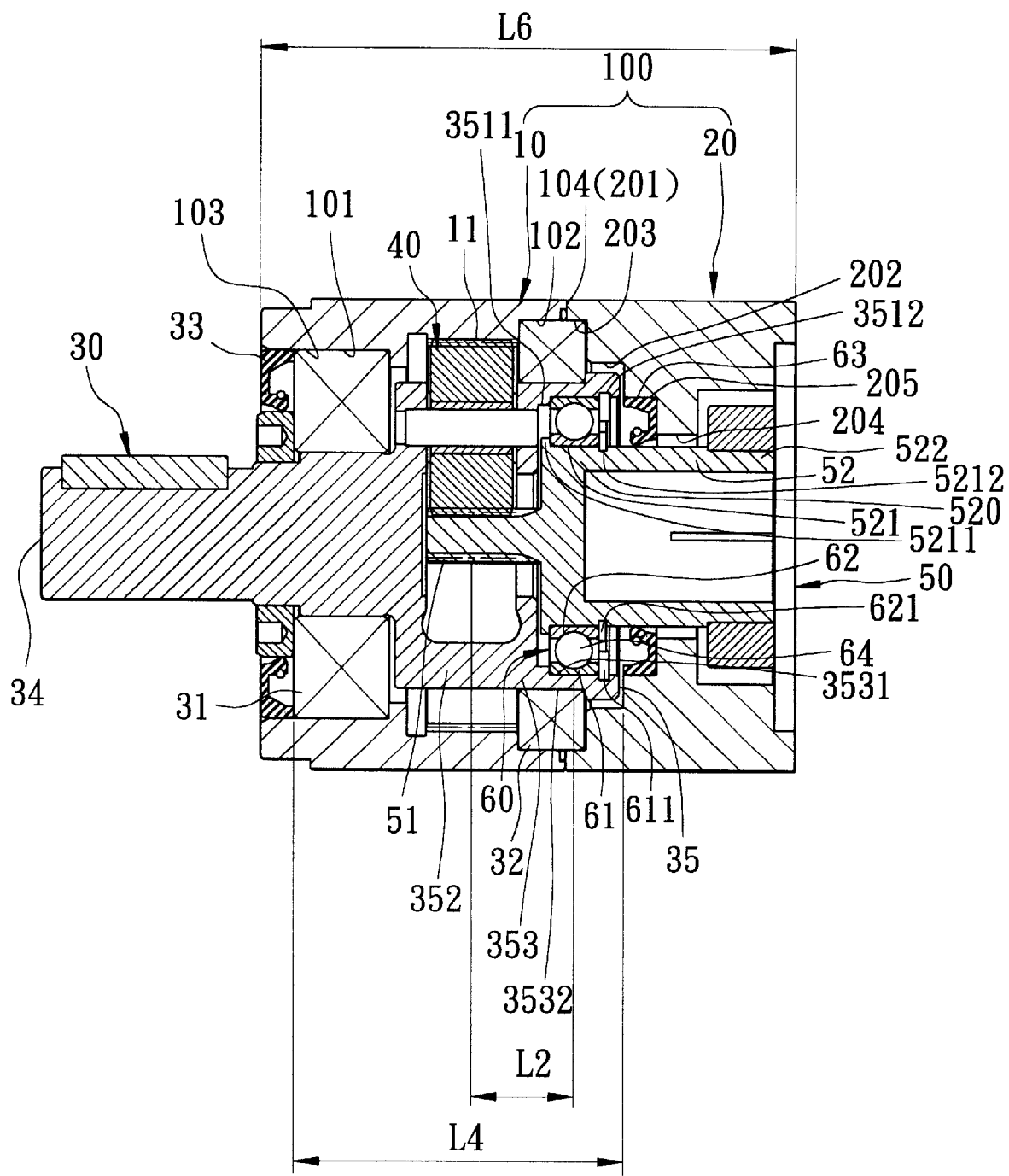
FIG. 3 is a sectional view of a preferred embodiment of a planetary gear device according to this invention.
Figure 4:
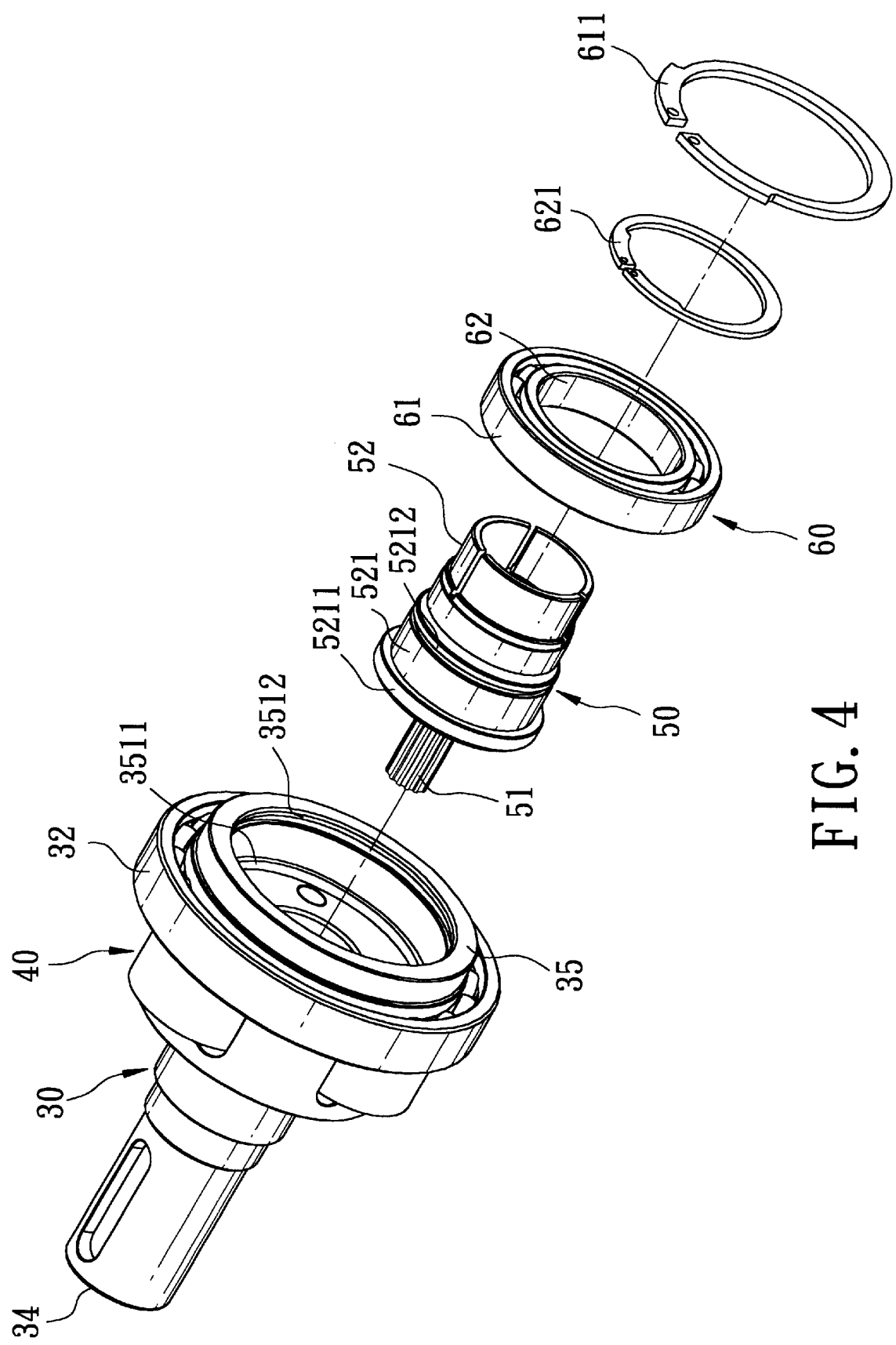
FIG. 4 is an exploded perspective view of the preferred embodiment with mounting and adapter frames thereof omitted for the sake of clarity.

Referring to FIGS. 3 and 4, the preferred embodiment of the planetary gear device according to the present invention is adapted for reducing a speed of an output shaft (not shown) of a motor, and is shown to comprise a frame assembly 100, a planet carrier 30, a plurality of planet wheel members 40, a first bearing member 31, a second bearing member 32, a force transmitting member 50, and a third bearing member 60.

The frame assembly 100 includes a mounting frame 10 and an adapter frame 20. The mounting frame 10 has an inner annular wall surface 101 which surrounds a first axis and which extends in an axial direction parallel to the first axis to confine an accommodation chamber. The inner annular wall surface 101 includes proximate and distal annular segments 102,103 opposite to each other in the axial direction, and an intermediate annular segment which is interposed therebetween. The intermediate annular segment has an inner annular toothed portion 11 which is disposed thereon and which surrounds the first axis. The mounting frame 10 further has a surrounding connecting end wall surface 104 which is disposed transverse to the inner annular wall surface 101 and proximate to the proximate annular segment 102. The adapter frame 20 has a surrounding abutting end wall surface 201 which is configured to mate with and which abuts against the surrounding connecting end wall surface 104, and an inner peripheral wall surface 202. The inner peripheral wall surface includes a first annular segment 203 which extends from the surrounding abutting end wall surface 201 in the axial direction and away from the mounting frame 10 and which surrounds the first axis, and a second annular segment 204 which extends from the first annular segment 203 in the axial direction. An annular seat member 205 is disposed to extend in radial directions relative to the axial direction between the first and second annular segments 203,204 to form a shoulder portion.

The planet carrier 30 includes an output shaft 34 and a carrying frame member 35. The output shaft 34 is rotatably mounted on the distal annular segment 103 about the first axis via the first bearing member 31 that is interposed therebetween, and extends outwardly of the accommodation chamber of the mounting frame 10 so as to be adapted to transmit rotary movement of a reduced speed to a load (not shown). An oil seal member 33 is disposed to enclose the accommodating chamber of the mounting frame 10. The carrying frame member 35 includes a mounting frame portion 352 which extends from the output shaft 34 in the axial direction and which is surrounded by the inner annular toothed portion 11, and a coupling frame portion 353 which extends from the mounting frame portion 352 in the axial direction. The coupling frame portion 353 includes inner and outer coupling annular wall surfaces 3531,3532 opposite to each other in the radial directions. The outer coupling annular wall surface 3532 is disposed to be rotatably mounted on the proximate annular segment 102 via the second bearing member 32 that is interposed therebetween. In addition, the second bearing member 32 is disposed to extend outwardly of the surrounding connecting end wall surface 104 of the mounting frame 10 to support rotatably the first annular segment 203 relative to the outer coupling annular wall surface 3532 about the first axis. Moreover, an outer annular barrier 3511 is formed on the inner coupling annular wall surface 3531 and projects inwardly and in the radial directions. An outer annular groove 3512 is formed in the inner coupling annular wall surface 3531 and surrounds the first axis.

The planet wheel members 40 are angularly displaced from one another, and are rotatably mounted on the mounting frame portion 352 about a plurality of second axes which are parallel to the first axis. As such, each of the planet wheel members 40 meshes with the inner annular toothed portion 11.

The force transmitting member 50 includes a sun wheel member 51 and a coupling tubular member 52. The sun wheel member 51 extends along the first axis, and is disposed to mesh with the planet wheel members 40. The coupling tubular member 52 includes a circumferential mounting portion 520 and a tubular coupling portion 522. The circumferential mounting portion 520 extends from the sun wheel member 51 in the axial direction, and has an outer circumferential wall surface 521 which confronts and which is rotatable relative to the inner coupling annular wall surface 3531. An inner annular barrier 5211 is formed on the outer circumferential wall surface 521, and projects toward the outer annular barrier 3511 in the radial direction. An inner annular groove 5212 is formed in the outer circumferential wall surface 521 and confronts the outer annular groove 3512. The tubular coupling portion 522 extends from the circumferential mounting portion 520 in the axial direction and outwardly of the coupling frame portion 353 so as to be adapted to couple with and to be driven by the output shaft of the motor.

The third bearing member 60 includes outer and inner annular races 61, 62 which are disposed to surround the first axis, and a ball bearing portion 64 which is interposed therebetween. The outer annular race 61 is disposed between the outer annular barrier 3511 and the outer annular groove 3512. The inner annular race 62 is disposed and is restrained between the inner annular barrier 5211 and the inner annular groove 5212. Outer and inner retaining rings 611,621 are disposed securely and respectively in the outer and inner annular grooves 3512,5212 and cooperate respectively with the outer and inner annular barriers 3511,5211 to restrain the outer and inner annular races 61,62 of the third bearing member 60 from moving in the axial direction.

Moreover, the shoulder portion of the annular seat member 205 of the adapter frame 20 is spaced apart from the third bearing member 60 in the axial direction. An annular oil seal member 63 is mounted on the shoulder portion and extends in the radial directions and towards the tubular coupling portion 522 to engage slidably the tubular coupling portion 522 so as to cooperate with the oil seal member 33 to confine a lubricating oil passage for the first, second and third bearing members 31,32,60, the inner annular toothed portion 11, the planet wheel members 40, and the sun wheel member 51.

As illustrated, since the third bearing member 60 is mounted between the inner coupling annular wall surface 3531 of the planet carrier 30 and the outer circumferential wall surface 521 of the coupling tubular member 52, the assembly between the mounting and adapter frames 10,20 does not affect the alignment of the sun wheel member 51 with the output shaft 34 of the planet carrier 30. Thus, the sun wheel member 51 can mesh with the planet wheel members 40 accurately.

Figure 1:
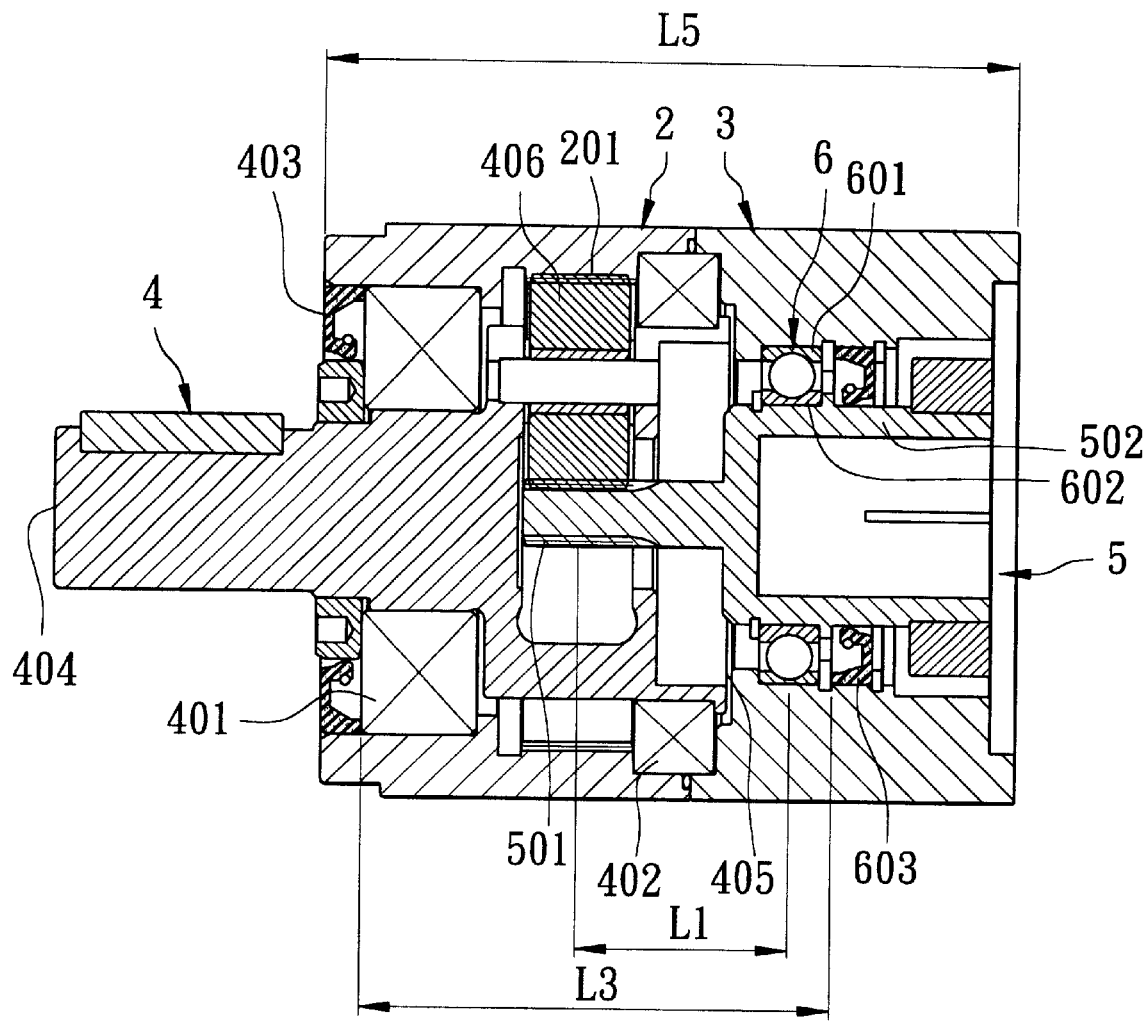
FIG. 1 is a sectional view of a conventional planetary gear device.
Figure 2:
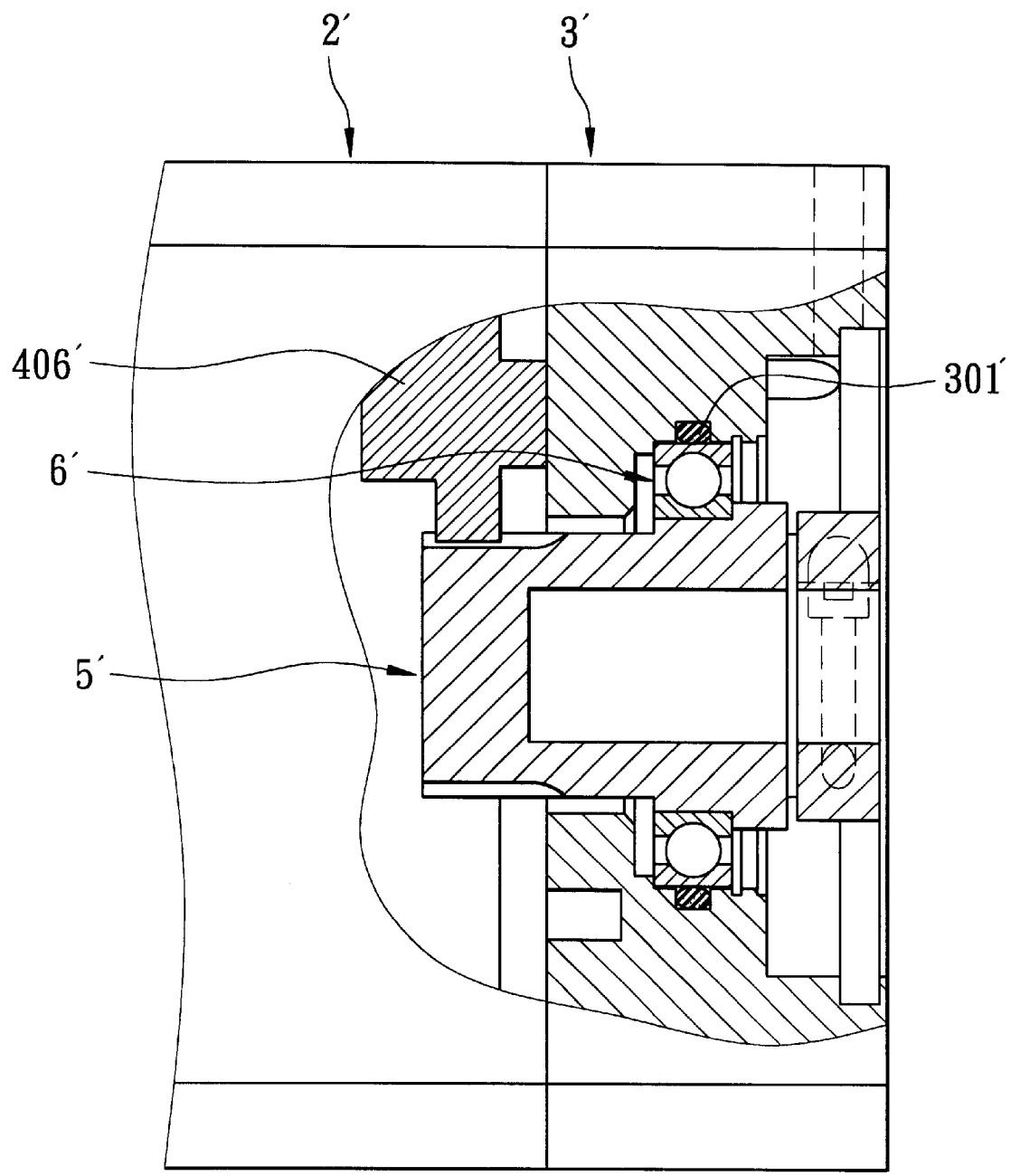
FIG. 2 is a fragmentary partly sectional view of another conventional planetary gear device.

In addition, as compared with the conventional planetary gear device shown in FIG. 1, the distance (L2) between the sun wheel member 51 and the third bearing member 60 is shorter than the corresponding distance (L1) in the prior art. Therefore, the sun wheel member 51 can possess a relatively high torsion stiffness. Further, the distance (L4) between the oil seal members 33, 63 is shorter than the corresponding distance (L3) in the prior art. That is, the length of the lubricating oil passage of the bearing members 32,60 is reduced. Moreover, the total length (L6) of the frame assembly 100 is also shorter than the total length (L1) of the prior art.

Further, since the outer and inner races 61,62 are rotated along with the planet carrier 30 and the force transmitting member 50 in the same rotating direction, the durability of the third bearing member 60 is greater than that of the prior art in which the outer race 601 of the third bearing member 6 is secured on the immobile adapter frame 3.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A planetary gear device for reducing speed of an output shaft of a motor, said planetary gear device comprising:

a mounting frame having an inner annular wall surface surrounding a first axis and extending in an axial direction parallel to the first axis to confine an accommodation chamber, said inner annular wall surface including proximate and distal annular segments opposite to each other in the axial direction, and an intermediate annular segment interposed therebetween and having an inner annular toothed portion disposed thereon and surrounding the first axis, said mounting frame further having a surrounding connecting end wall surface which is disposed transverse to said inner annular wall surface and proximate to said proximate annular segment;

a planet carrier including
an output shaft rotatably mounted on said distal annular segment about the first axis, and extending outwardly of said accommodation chamber so as to be adapted to transmit rotary movement of reduced speed to a load, and
a carrying frame member including a mounting frame portion which extends from said output shaft in the axial direction and which is surrounded by said inner annular toothed portion, and a coupling frame portion which extends from said mounting frame portion in the axial direction and which includes inner and outer coupling annular wall surfaces opposite to each other in radial directions relative to the axial direction, said outer coupling annular wall surface being disposed to be rotatably mounted on said proximate annular segment;

a plurality of planet wheel members angularly displaced from one another and rotatably mounted on said mounting frame portion about a plurality of second axes which are parallel to the first axis such that each of said planet wheel members meshes with said inner annular toothed portion;

a first bearing member interposed between said distal annular segment and said output shaft to permit relative rotation therebetween;

a second bearing member interposed between said proximate annular segment and said outer coupling annular wall surface to permit relative rotation therebetween;

a force transmitting member including a sun wheel member extending along the first axis and disposed to mesh with said planet wheel members, and a coupling tubular member including a circumferential mounting portion which extends from said sun wheel member in the axial direction and which has an outer circumferential wall surface that confronts and that is rotatable relative to said inner coupling annular wall surface, and a tubular coupling portion which extends from said circumferential mounting portion in the axial direction and outwardly of said coupling frame portion so as to be adapted to couple with and be driven by the output shaft of the motor;

a third bearing member interposed between said inner coupling annular wall surface and said outer circumferential wall surface to permit relative rotation therebetween; and an adapter frame having a surrounding abutting end wall surface which is configured to mate with and abut against said surrounding connecting end wall surface, and an inner peripheral wall surface which includes a first annular segment that extends from said surrounding abutting end wall surface in the axial direction and away from said mounting frame, and that surrounds the first axis;

wherein said second bearing member is disposed to extend outwardly of said surrounding connecting end wall surface to support rotatably said first annular segment relative to said outer coupling annular wall surface about the first axis.

2. The planetary gear device of claim 1, further comprising outer and inner annular barriers respectively disposed on said inner coupling annular wall surface and said outer circumferential wall surface and projecting toward each other in the radial directions so as to restrain said third bearing member from moving in the axial direction toward said sun wheel member.

3. The planetary gear device of claim 2, wherein said third bearing member includes outer and inner annular races that surround the first axis, and a ball bearing portion interposed therebetween, said inner coupling annular wall surface and said outer circumferential wall surface respectively having outer and inner annular grooves surrounding the first axis, said device further comprising outer and inner retaining rings which are disposed securely and respectively in said outer and inner annular grooves, and which respectively cooperate with said outer and inner annular barriers to restrain said outer and inner annular races of said third bearing member from moving in the axial direction.

4. The planetary gear device of claim 1, wherein said inner peripheral wall surface of said adapter frame further includes a second annular segment extending from said first annular segment in the axial direction, said adapter frame further including an annular seat member disposed to extend in radial directions and towards said tubular coupling portion to form a shoulder portion which is spaced apart from said third bearing member in the axial direction, said device further comprising an annular oil seal member mounted on said shoulder portion and extending in the radial directions and towards said tubular coupling portion to engage slidably said tubular coupling portion.

* * * * *